J. T. WILSON.
PACKING FOR PISTON VALVES AND PISTONS.
APPLICATION FILED MAR. 3, 1906.
898,541.
Patented Sept. 15, 1908.
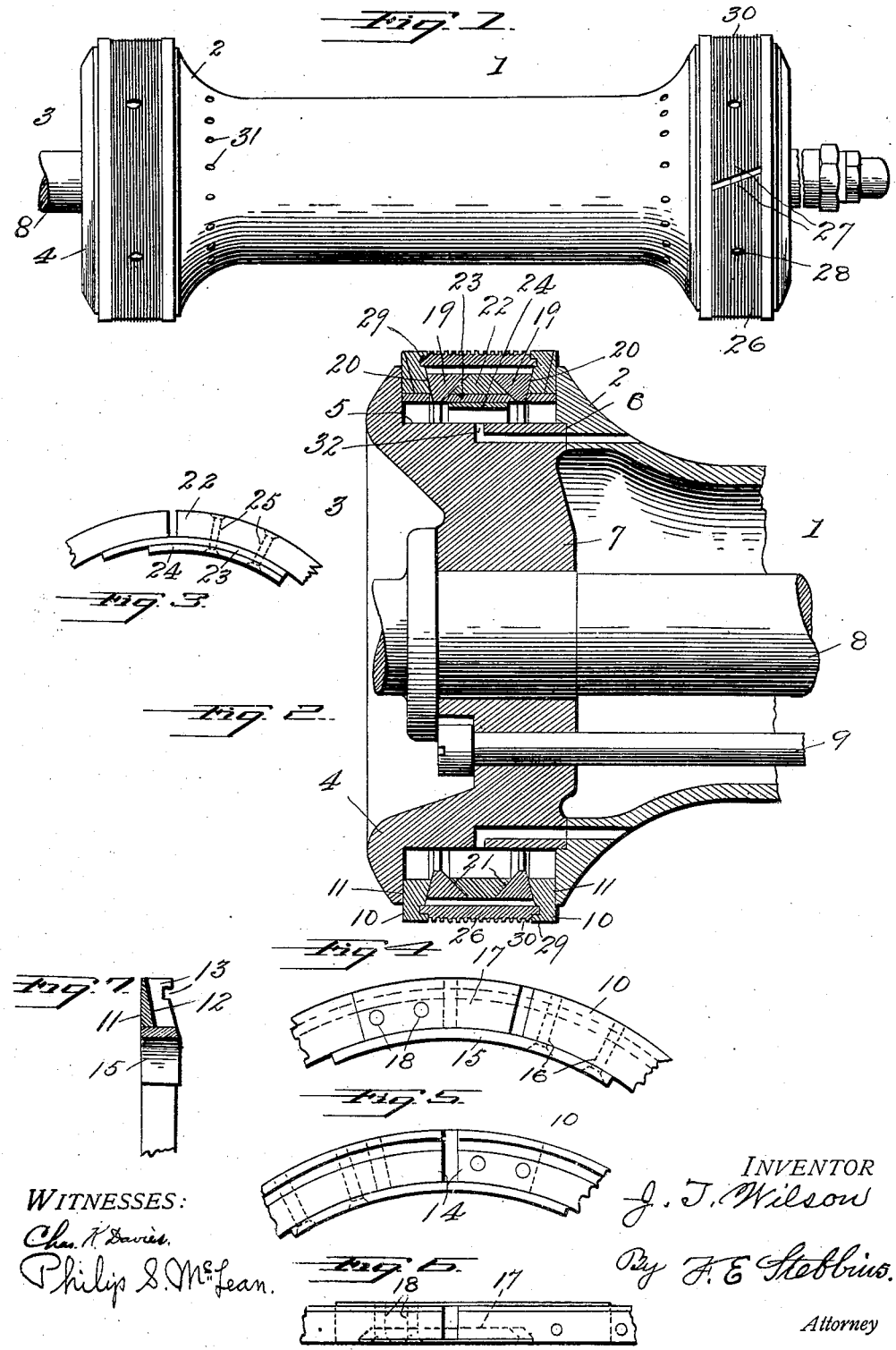
WITNESSES:
Chas. K Davies.
Philip S. McLean.
INVENTOR
J. T. Wilson
By F. E. Stebbins.
Attorney

UNITED STATES PATENT OFFICE.

JOHN T. WILSON, OF JERSEY SHORE, PENNSYLVANIA.

PACKING FOR PISTON-VALVES AND PISTONS.

No. 898,541.          Specification of Letters Patent.          Patented Sept. 15, 1908.

Application filed March 3, 1906. Serial No. 303,973.

*To all whom it may concern:*

Be it known that I, JOHN T. WILSON, a citizen of the United States, residing at Jersey Shore, in the county of Lycoming and State of Pennsylvania, have invented new and useful Improvements in Packings for Piston-Valves and Pistons, of which the following is a specification.

This invention relates to piston valves and pistons, and especially to the packing for the same, my main object being the provision of a packing having snap or bearing rings which shall retain their normal parallel positions while in service and not move laterally or tip sidewise and occupy positions where the edges of the rings are liable to engage or catch into the metallic edges of the cage or lining which bound the ports.

Further objects are the provision of a packing having snap rings which will expand simultaneously and not independently of each other; and the provision of a wide ring in connection with the snap rings which shall be approximately balanced when in positions lapping over or on either side of a port, and which shall also prevent the snap rings from expanding into the ports.

With these ends in view my invention consists in certain novelties of construction and combinations of parts as hereafter set forth and specified in the claims.

The accompanying drawing illustrates an example of the physical embodiment of my invention constructed according to the best of the several modes I have so far devised for the practical application of the principle and to attain the results above recited.

Figure 1 shows a piston valve in elevation. Fig. 2 is a vertical section of one end of the valve and in elevation. Fig. 3 shows the wedge ring joint. Figs. 4, 5, and 6 are opposite side and top plan views of a snap ring joint. Fig. 7 is a cross section of Fig. 6 between the free ends of the ring and through the bottom and side joint plates.

Referring to the several views, the numeral 1 designates the spool; 2, the flange of the spool; 3, the follower; 4, the flange of the follower; 5, the rim of the follower; 6, the joint between the rim of the follower and the end of the spool; 7, the perforated hub of the follower; 8, the valve stem of any approved construction; 9, a retaining bolt threaded at the end not shown and engaging a threaded hole in the follower at the opposite end of the spool body; 10, the snap rings; 11, the vertical plain side of the snap ring; 12, the beveled surface; 13, a circular groove at the outer edge of the beveled surface; 14, the free ends of the ring; 15, the bottom joint plate; 16, machine screws which secure one end of the joint plate to one end of the snap ring; 17, a side joint plate; 18, machine screws which secure one end of the side joint plate to the free end of the snap ring opposite to the end of the snap ring to which the bottom joint plate is secured; 19, the integral wall rings; 20, the outer beveled surface in contact with the beveled surface of a snap ring; 21, the inner beveled surface in contact with a beveled surface of a wedge ring; 22, the wedge ring; 23, the joint plate; 24, a spring plate; 25, machine screws passed through the ends of the wedge ring, joint plate, and spring plate; 26, the wide ring; 27, the free ends of the wide ring; 28, holes through the wide ring; 29, tongues at opposite edges of the wide ring which fit within the grooves 13 in the snap rings; 30, circular parallel grooves in the outer surface of the wide ring of a V-shape, forming ribs or bastard screw threads; 31, a series of small passages made in the end of the spool and follower; and 32 are the ports of the passages for delivering steam to the under surface of the wedge ring and the space beneath the other rings.

The relative locations of the several parts and elements are clearly shown by the figures.

The mode of operation is as follows: Assuming the piston valve to be in operative position within a cylinder or cage with suitable ports, and steam admitted to the space between the spool and cylinder, the steam will enter the passages 31, be delivered by way of the ports 32 to the space beneath the rings, expand the snap rings against the surface of the cylinder and expand the wedge ring against the two wall rings. As the wall rings are integral and cannot expand they are forced sidewise and press and hold the snap rings against the flanges of the spool and follower. When the piston moves, for example, towards the left and passes over the port, the wide ring holds the snap rings parallel so they cannot tip sidewise and their edges catch the edges of the metal bounding the port. Nor can the snap rings expand into the port or opening, inasmuch as both snap rings are held by the wide ring so that they can expand only at the same time, and only one snap ring at a time is in line with the port. As the wide ring is provided with holes 28 steam can enter beneath the ring when the same is in line with the port. To secure an approximate equal pressure upon the top and bottom surfaces of this ring at all positions of its travel the grooves 30 are provided in the outer surface of the ring, which grooves contain steam even when the edge or entire area of the ring has moved to one side of the port. In other words, the wide ring is practically balanced at all positions of its travel. It is, moreover, obvious that the snap rings will at all times be held against the surface of the cylinder or cage, as the area of the packing exposed to pressure from the port is always less than the area of the under surface of the packing adjacent the rim of the follower to which steam is admitted by way of the passages 31 in the spool body. The bastard threads which define the V-shaped grooves in the surface of the wide ring touch the inner surface of the cage and prevent the snap rings from expanding into the port and also prevent an excessive expansion and friction of the ring itself when at one side of a port should the tongue of the ring loosely fit the groove in the side of the snap ring. When steam is cut off and the locomotive is in motion the wedge ring is contracted by air pressure from the port, but the snap rings and the wide ring may remain in contact with the cage and at such time the wide ring serves two purposes—it keeps the snap rings from lateral motion and getting out of alinement with each other, and also prevents them expanding into the port, especially when the port is made without bridges. When working under steam the locking of the wall rings against the beveled sides of the snap rings prevents them expanding, and the latter prevent the wide ring expanding if the same be not balanced through the medium of the grooves in its surface.

It is of course understood that the snap rings are made larger than the cage and are contracted when the piston valve is placed in working position within the cage, so that they are always under tension.

Heretofore it has been impossible successfully to use wide rings with piston valves owing to the great friction of their outer surfaces against the cage. My invention effectively obviates this difficulty.

While I have shown and described only one example of the application of the principles of the invention, it is obvious that it may be applied by other modes and in connection with other types of snap rings in different relations and combinations and to prevent the snap rings from expanding into the port or ports.

What I claim is:

1. A packing for piston valves and pistons comprising a wide ring, two expansible snap rings, means for introducing live steam beneath the snap rings and means for holding in parallel positions the inner portions or edges of the snap rings.

2. A packing for piston valves and pistons comprising a wedge ring, two wall rings, two snap rings, and a wide ring between the snap rings.

3. A packing for piston valves and pistons comprising an expansible wedge ring, two non-expansible wall rings; two expansible snap rings, and an expansible wide ring.

4. A packing for piston valves and pistons provided with two expansible snap rings, and an expansible wide ring; said wide ring interlocking with the edges of the snap rings.

5. A packing for piston valves and pistons having two bearing rings and a wide ring between said rings with its edges engaging the said bearing rings, whereby the bearing rings are held parallel.

6. A packing for piston valves and pistons having two bearing rings and a wide ring located between and interlocking with said bearing rings; whereby a bearing ring is prevented from expanding into a port.

7. A packing for piston valves and pistons having two expansible bearing rings and a wide expansible ring between and interlocking with said rings; said wide ring having an opening or holes therethrough for the passage of steam to the underside thereof when over a port.

8. A packing for piston valves or pistons having a wide ring provided with a series of longitudinal grooves in its exterior surface; two snap rings located at the opposite edges of the wide ring and with their outer bearing surfaces substantially in line with the outer bearing surface of the wide ring; and means for holding the wide and snap rings in alinement; for the purpose set forth.

9. A packing for piston valves and pistons having two bearing rings and a wide ring engaging said two rings; the exterior surface of the said wide ring having a series of longitudinally disposed grooves and ribs.

10. The combination with a piston valve or piston, of a packing comprising two snap rings, a wide ring, two wall rings, and a wedge ring; means being provided for admitting steam to the inner surfaces of the wedge and snap rings.

11. The combination with a piston valve or piston, of a packing having two snap rings each provided with a groove in one of its sides, and a wide ring with its edges located in the grooves and movable therein; the exterior or bearing surfaces of the snap and wide rings being substantially in alinement.

12. The combination with a piston valve or piston, of a packing comprising two snap rings, a wide ring, two non-expansible wall rings, and a wedge ring; means being provided for the admission of steam to the under surface of the packing.

13. The combination with a piston valve or piston, of two snap rings, a wide ring with an opening therethrough; two wall rings; and a wedge ring; means being provided for the admission of steam to the under surface of the packing.

14. A packing for piston valves and pistons comprising a wedge ring, two wall rings with beveled surfaces or sides, two snap rings each having one side beveled and each provided with a groove, and a wide ring between the snap rings.

15. A packing for piston valves and pistons having two bearing rings spaced apart, and a wide ring interlocking with said bearing rings; the exterior surface of said wide ring being provided with a series of grooves and ribs or projections.

In testimony whereof I affix my signature in presence of two witnesses.

JOHN T. WILSON.

Witnesses:
JNO. P. STEVENS,
HARRY R. MASTERS.